(12) United States Patent
Nagai et al.

(10) Patent No.: US 12,091,606 B2
(45) Date of Patent: *Sep. 17, 2024

(54) WORKING FLUID COMPOSITION FOR REFRIGERATOR, REFRIGERATOR OIL AND REFRIGERATOR

(71) Applicant: ENEOS Corporation, Tokyo (JP)

(72) Inventors: Satoshi Nagai, Tokyo (JP); Tatsuki Nakajima, Tokyo (JP); Yuya Mizutani, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 17/623,424

(22) PCT Filed: Jun. 17, 2020

(86) PCT No.: PCT/JP2020/023788
§ 371 (c)(1),
(2) Date: Dec. 28, 2021

(87) PCT Pub. No.: WO2021/005983
PCT Pub. Date: Jan. 14, 2021

(65) Prior Publication Data
US 2022/0332996 A1    Oct. 20, 2022

(30) Foreign Application Priority Data
Jul. 5, 2019  (JP) .................................. 2019-126492

(51) Int. Cl.
*C09K 5/04* (2006.01)
*C10M 107/32* (2006.01)
(Continued)

(52) U.S. Cl.
CPC .......... *C09K 5/044* (2013.01); *C10M 107/32* (2013.01); *C10M 129/10* (2013.01);
(Continued)

(58) Field of Classification Search
CPC .......... C10N 2020/101; C10N 2040/30; C10N 2030/02; C10N 2020/02; C10N 2030/10;
(Continued)

(56) References Cited

U.S. PATENT DOCUMENTS

2006/0033072 A1   2/2006  Wilson et al.
2017/0321099 A1   11/2017 Sethi et al.
(Continued)

FOREIGN PATENT DOCUMENTS

CN   1965049      5/2007
CN   102533392    7/2012
(Continued)

OTHER PUBLICATIONS

ISR issued in International Patent Application No. PCT/JP2020/023788, Sep. 15, 2020, English translation.
(Continued)

*Primary Examiner* — Vishal V Vasisth
(74) *Attorney, Agent, or Firm* — GREENBLUM & BERNSTEIN, P.L.C.

(57) ABSTRACT

A working fluid composition for a refrigerating machine, containing: a refrigerant containing trifluoroiodometbane; and a refrigerating machine oil containing a polyol ester and a hindered phenol compound, wherein a content of the hindered phenol compound is 0.6 to 10% by mass based on a total amount of the refrigerating machine oil.

5 Claims, 1 Drawing Sheet

(51) Int. Cl.
*C10M 129/10* (2006.01)
*C10M 129/18* (2006.01)
*C10M 129/40* (2006.01)
*C10M 169/04* (2006.01)
*C10N 30/10* (2006.01)
*C10N 40/30* (2006.01)

(52) U.S. Cl.
CPC ........ *C10M 129/18* (2013.01); *C10M 129/40* (2013.01); *C10M 169/04* (2013.01); *C09K 2205/10* (2013.01); *C10M 2207/023* (2013.01); *C10M 2207/042* (2013.01); *C10M 2207/126* (2013.01); *C10M 2209/1023* (2013.01); *C10M 2215/064* (2013.01); *C10N 2030/10* (2013.01); *C10N 2040/30* (2013.01)

(58) Field of Classification Search
CPC ...... C10N 2030/20; C09K 5/04; C09K 5/044; C09K 2205/10; C10M 129/18; C10M 171/008; C10M 107/32; C10M 169/04; C10M 129/40; C10M 129/10; C10M 2211/022; C10M 2215/064; C10M 2207/026; C10M 2207/023; C10M 2207/2835; C10M 2209/1023; C10M 2207/042; C10M 2207/126
See application file for complete search history.

(56) References Cited

U.S. PATENT DOCUMENTS

| | | | |
|---|---|---|---|
| 2018/0030324 A1 | 2/2018 | Sethi et al. | |
| 2018/0030325 A1 | 2/2018 | Petersen et al. | |
| 2018/0215977 A1* | 8/2018 | Okido | C10M 171/008 |
| 2019/0194567 A1* | 6/2019 | Shono | C09K 5/04 |
| 2019/0249055 A1* | 8/2019 | Sethi | C10M 107/24 |

FOREIGN PATENT DOCUMENTS

| | | |
|---|---|---|
| CN | 103965987 | 8/2014 |
| CN | 105940091 | 9/2016 |
| CN | 109689830 | 4/2019 |
| CN | 109689832 | 4/2019 |
| CN | 109715758 | 5/2019 |
| JP | 2007-532766 | 11/2007 |
| JP | 2009-074021 | 4/2009 |
| JP | 2014-114354 A | 6/2014 |
| JP | 2015-514827 | 5/2015 |
| JP | 2018-053199 A | 4/2018 |
| WO | 2005/103187 | 11/2005 |
| WO | 2013/138123 | 9/2013 |
| WO | 2018/022888 | 2/2018 |
| WO | 2018/022943 | 2/2018 |
| WO | 2018/022949 | 2/2018 |

OTHER PUBLICATIONS

IPRP issued in International Patent Application No. PCT/JP2020/023788, Jan. 20, 2022, English translation.

* cited by examiner

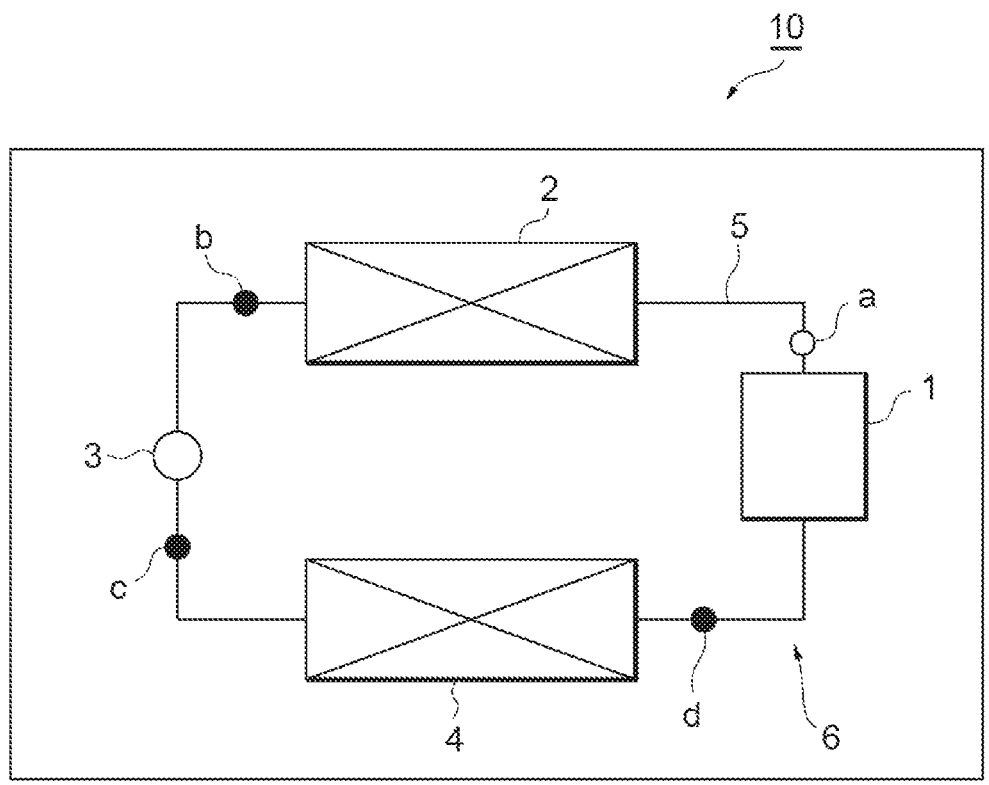

WORKING FLUID COMPOSITION FOR REFRIGERATOR, REFRIGERATOR OIL AND REFRIGERATOR

This application is a 371 of PCT/JP2020/023788, filed Jun. 17, 2020.

TECHNICAL FIELD

The present invention relates to a working fluid composition for a refrigerating machine, a refrigerating machine oil and a refrigerating machine.

BACKGROUND ART

Refrigerating machines, such as refrigerators, car air conditioners, room air conditioners, vending machines, and the like, include a compressor for circulating a refrigerant through a refrigeration cycle. The compressor is filled with refrigerating machine oil for lubricating the sliding members. A refrigerating machine oil is generally required to have properties such as abrasion resistance and stability, and contains a lubricating base oil and various additives selected according to the required properties.

In recent years, as a refrigerant to be circulated in a refrigeration cycle, application of a nonflammable refrigerant having a low global warming potential (GWP) has been studied from the viewpoint of measures against global warming and safety. For example, Patent Document 1 discloses a refrigerant containing trifluoroiodomethane as a refrigerant in a refrigeration system.

CITATION LIST

Patent Document

[Patent Document 1] Japanese Unexamined Patent Publication No. 2015-514827

SUMMARY OF INVENTION

Technical Problem

However, in addition to the fact that it is known that the refrigerant containing trifluoroiodomethane tends to have very low stability, the present inventors have found that the use of the refrigerant causes a problem of generation of impurities. When the impurities are generated, there is a possibility that the performance of the refrigerating machine is deteriorated, for example, the clogging of the capillary or the deterioration of the cooling efficiency.

The present invention has been made in view of such circumstances, and an object of the present invention is to provide a working fluid composition for a refrigerating machine and a refrigerating machine oil capable of suppressing generation of impurities even when a refrigerant containing trifluoroiodomethane is used, and a refrigerating machine filled with these.

Solution to Problem

As a result of intensive studies to solve the above-described problems, the present inventors have found that the generation of the above-described impurities can be suppressed by blending a predetermined amount of a hindered phenol compound in a predetermined refrigerating machine oil, and have completed the present invention. The present inventors presume that the generation of impurities is caused by corrosion of various metals such as copper that may be present in the refrigerant circulation system of the refrigerating machine by products of decomposition of trifluoroiodomethane and refrigerating machine oil.

The present invention provides a working fluid composition for a refrigerating machine comprising: a refrigerant comprising trifluoroiodomethane; and a refrigerating machine oil comprising a polyol ester and a hindered phenol compound, wherein a content of the hindered phenol compound is 0.6 to 10% by mass based on a total amount of the refrigerating machine oil.

The refrigerating machine oil may further comprise an acid scavenger.

The present invention also provides a refrigerating machine oil comprising: a polyol ester; and a hindered phenol compound, wherein a content of the hindered phenol compound is 0.6 to 10% by mass based on a total amount of the refrigerating machine oil, and the refrigerating machine oil is used together with a refrigerant comprising trifluoroiodomethane.

The present invention further provides a refrigerating machine comprising: a refrigerant circulation system in which a compressor, a condenser, an expansion mechanism, and an evaporator are connected by piping in this order; and the working fluid composition for a refrigerating machine according to the above present invention filled in the refrigerant circulation system.

Advantageous Effects of Invention

According to the present invention, it is possible to provide a working fluid composition for a refrigerating machine and a refrigerating machine oil capable of suppressing generation of impurities even when a refrigerant containing trifluoroiodomethane is used. Further, according to the present invention, even when a refrigerant containing trifluoroiodomethane is used, the stability of the refrigerating machine oil and the like can be sufficiently ensured. Further, according to the present invention, a refrigerating machine filled with the working fluid composition for a refrigerating machine can be provided.

BRIEF DESCRIPTION OF DRAWINGS

FIG. 1 is a schematic diagram illustrating an embodiment of the refrigerating machine.

DESCRIPTION OF EMBODIMENTS

Embodiments of the present invention will now be described in detail.

The refrigerating machine oil according to the present embodiment contains a polyol ester and a hindered phenol compound.

The polyol ester is an ester of a polyhydric alcohol and a fatty acid. As the fatty acid, a saturated fatty acid is preferably used. The number of carbon atoms of the fatty acid is preferably 4 to 20, more preferably 4 to 18, still more preferably 4 to 9, particularly preferably 5 to 9, and extremely preferably 8 to 9. The polyol ester may be a partial ester in which some of the hydroxyl groups of the polyhydric alcohol are not esterified and remain as hydroxyl groups, may be a complete ester in which all of the hydroxyl groups are esterified, or may be a mixture of the partial ester and the complete ester.

Among the fatty acids constituting the polyol ester, the proportion of the fatty acid having the above-described preferable number of carbon atoms is preferably 20% by mole or more, more preferably 50% by mole or more, still more preferably 60% by mole or more, particularly preferably 70% by mole or more, and extremely preferably 90% by mole or more, and the proportion is preferably 100% by mole or less. In particular, when a fat acid having 9 carbon atoms is contained as the fatty acid constituting the polyol ester, the proportion of the fatty acid is preferably 40% by mole or more, more preferably 52% by mole or more, and even more preferably 60% by mole or more, and is preferably 100% by mole or less, more preferably 90% by mole or less, even more preferably 80% by mole or less, and particularly preferably 70% by mole or less.

In addition, among the fatty acids constituting the polyol ester, specific examples of the fatty acid having the above-described preferable number of carbon atombs (that is, a fatty acid having 4 to 20 carbon atoms) include a butanoic acid, a pentanoic acid, a hexanoic acid, a heptanoic acid, an octanoic acid, a nonanoic acid, a decanoic acid, an undecanoic acid, a dodecanoic acid, a tridecanoic acid, a tetradecanoic acid, a pentadecanoic acid, a hexadecanoic acid, a heptadecanoic acid, an octadecanoic acid, a nonadecanoic acid, and an icosanoic acid. These fatty acids may be linear or branched, but are preferably branched. The fatty acid is more preferably a fatty acid having a branch at the α-position and/or the β-position, and still more preferably a branched fatty acid having 4 to 9 carbon atoms. Specifically, it is selected from 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid and 2-ethylhexadecanoic acid, and among them, 2-ethylhexanoic acid or 3,5,5-trimethylhexanoic acid is preferable.

When the fatty acid constituting the polyol ester contains a branched fatty acid having 4 to 9 carbon atoms, the polyol ester preferably contains 40% by mole or more of 3,5,5-trimethylhexanoic acid having good compatibility with trifluoroiodomethane from the viewpoint of maintaining the kinematic viscosity and the refrigerant solution viscosity. On the other hand, when the amount of 3,5,5-trimethylhexanoic acid is too large, the polyol ester tends to be easily decomposed in the presence of trifluoroiodomethane. Therefore, the proportion of 3,5,5-trimethylhexanoic acid may be preferably 51% by mole or more, more preferably 60% by mole or more, and preferably 90% by mole or less, more preferably 80% by mole or less, particularly preferably 70% by mole or less.

The fatty acid may contain a fatty acid other than a fatty acid having 4 to 20 carbon atoms. The fatty acid other than the fatty acid having 4 to 20 carbon atoms may be, for example, a fatty acid having 21 to 24 carbon atoms. The fatty acid having 21 to 24 carbon atoms may be, for example, heneicosanoic acid, docosanoic acid, tricosanoic acid, or tetracosanoic acid, and may be linear or branched.

As the polyhydric alcohol constituting the polyol ester, a polyhydric alcohol having 2 to 6 hydroxyl groups is preferably used. The number of carbon atoms of the polyhydric alcohol is preferably 4 to 12, and more preferably 5 to 10. The polyhydric alcohol is preferably a hindered alcohol such as neopentyl glycol, trimethylolethane, trimethylolpropane, trimethylolbutane, di-(trimethylolpropane), tri-(trimethylolpropane), pentaerythritol, or dipentaerythritol, and more preferably pentaerythritol, dipentaerythritol, or a mixed alcohol of pentaerythritol and dipentaerythritol because of particularly excellent compatibility with a refrigerant and hydrolysis stability.

The refrigerating machine oil according to the present embodiment may contain only the polyol ester as the lubricating base oil, but may contain a lubricating base oil other than the polyol ester. The content of the polyol ester in the lubricating base oil may be 50% by mass or more, 60% by mass or more, 70% by mass or more, 80% by mass or more, or 90% by mass or more, based on the total amount of the lubricating base oil.

As such a lubricating base oil, a hydrocarbon oil, an oxygen-containing oil other than the polyol ester, or the like can be used. Examples of the hydrocarbon oil include mineral hydrocarbon oils and synthetic hydrocarbon oils. Examples of the oxygen-containing oil include esters other than the polyol esters, ethers, carbonates, ketones, silicones, and polysiloxanes.

The mineral hydrocarbon oil can be obtained by purifying a lubricating oil fraction obtained by atmospheric distillation and vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. One of these purification methods may be used alone, or two or more of them may be used in combination.

Examples of the synthetic hydrocarbon oil include an alkylbenzene, an alkylnaphthalene, a poly-α-olefin (PAO), a polybutene, and an ethylene-α-olefin copolymer.

Examples of the ester other than the polyol ester include an aromatic ester, a dibasic acid ester, a complex ester, a carbonate ester, and a mixture of two or more thereof.

Examples of ethers include a polyvinyl ether, a polyalkylene glycol, a polyphenyl ether, a perfluoroether, and mixtures thereof.

The kinematic viscosity at 40° C. of the lubricating base oil may be preferably 3 mm$^2$/s or more, more preferably 4 mm$^2$/s or more, and still more preferably 5 mm$^2$/s or more. The kinematic viscosity at 40° C. of the lubricating base oil may be preferably 1000 mm$^2$/s or less, more preferably 500 mm$^2$/s or less, and still more preferably 400 mm$^2$/s or less. The kinematic viscosity at 100° C. of the lubricating base oil may be preferably 1 mm$^2$/s or more, more preferably 2 mm$^2$/s or more. The kinematic viscosity at 100° C. of the lubricating base oil may be preferably 100 mm/s or less, more preferably 50 mm$^2$/s or less. The kinematic viscosity in the present invention means a kinematic viscosity measured in accordance with JIS K2283:2000.

The content of the lubricating base oil may be 50% by mass or more, 60% by mass or more, 70% by mass or more, 80% by mass or more, or 90% by mass or more, based on the total amount of the refrigerating machine oil.

The refrigerating machine oil according to the present embodiment contains a hindered phenol compound. In the present specification, the hindered phenol compound is a compound having a structure in which at least one hydroxyl groups and at least one, preferably two tert-butyl groups are adjacently bonded to a benzene ring. Examples of the hindered phenol compound include 2,6-di-tert.-butyl-p-cresol (DBPC), 2,6-di-tert.-butyl-phenol, 4,4'-methylenebis(2,6-di-tert.-butyl-phenol), and a group of compounds having similar structures to these, and DBPC is preferably used. The content of the hindered phenol compound is 0.6% by mass or more, preferably 0.7% by mass or more, more preferably 0.8% by mass or more, still more preferably 0.9% by mass or more, based on the total amount of the refrigerating machine oil. When the content of the hindered phenol compound is 0.6% by mass or more, preferably 0.7% by mass or more, based on the total amount of the refrigerating machine oil, there is a tendency that the generation of impurities caused by trifluoroiodomethane described below can be sufficiently suppressed, and the stability of the refrigerating machine oil can be ensured. On the other hand, when the content of the hindered phenol compound is 0.5% by mass or less based on the total amount of the refrigerating machine oil, there is a tendency that the generation of impurities caused by trifluoroiodomethane cannot be sufficiently suppressed. In addition, the content of the hindered phenol compound is 10% by mass or less based on the total amount of the refrigerating machine oil, and in the case of exceeding this, an effect corresponding to the addition amount is not exhibited. Therefore, from such a viewpoint, the content of the hindered phenol compound is preferably 5% by mass or less, more preferably 4% by mass or less, further preferably 3.0% by mass or less, particularly preferably 2.9% by mass or less, extremely preferably 2.8% by mass or less, and very preferably 2.7% by mass or less, based on the total amount of the refrigerating machine oil.

The refrigerating machine oil according to the present embodiment may further contain an acid scavenger.

Examples of the acid scavenger include epoxy compounds (epoxy-based acid scavengers). Examples of the epoxy compound include glycidyl ether type epoxy compounds, glycidyl ester type epoxy compounds, aryloxirane compounds, alkyloxirane compounds, cycloaliphatic epoxy compounds, epoxidized fat acid monoesters, and epoxidized vegetable oils. These acid scavengers can be used alone as one species or in combination of two or more species.

As the glycidyl ether type epoxy compound, for example, an aryl glycidyl ether type epoxy compound or an alkyl glycidyl ether type epoxy compound represented by the following formula (1) can be used.

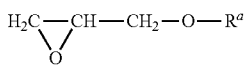
(1)

In the formula (1), $R^a$ represents an aryl group or an alkyl group having 5 to 18 carbon atoms.

The glycidyl ether type epoxy compound represented by the formula (1) is preferably phenyl glycidyl ether, n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, or 2-ethylhexyl glycidyl ether.

When the number of carbon atoms of the alkyl group represented by $R^a$ is 5 or more, the stability of the epoxy compound is ensured, and it is possible to suppress decomposition before reacting with moisture, a fatty acid, or an oxidation-degraded product, or to suppress self-polymerization in which epoxy compounds are polymerized with each other, and thus it is easy to obtain a target function. On the other hand, when the number of carbon atoms of the alkyl group represented by $R^a$ is 18 or less, the solubility with the refrigerant is kept good, and it is possible to make it difficult to cause defects such as poor cooling due to precipitation in the refrigeration apparatus.

As the glycidyl ether type epoxy compound, in addition to the epoxy compound represented by the formula (1), neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, polyalkylene glycol diglycidyl ether, and the like can also be used.

As the glycidyl ester type epoxy compound, for example, a compound represented by the following formula (2) can be used.

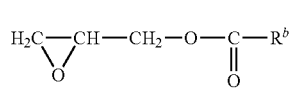
(2)

In the formula (2), $R^b$ represents an aryl group, an alkyl group having 5 to 18 carbon atoms, or an alkenyl group.

As the glycidyl ester type epoxy compound represented by the formula (2), glycidyl benzoate, glycidyl neodecanoate, glycidyl-2,2-dimethyloctanoate, glycidyl acrylate, and glycidyl methacrylate are preferable.

When the number of carbon atoms of the alkyl group represented by $R^b$ is 5 or more, the stability of the epoxy compound is ensured, and it is possible to suppress decomposition before reacting with moisture, a fatty acid, or an oxidation-degraded product, or to suppress self-polymerization in which epoxy compounds are polymerized with each other, and it is easy to obtain a target function. On the other hand, when the number of carbon atoms of the alkyl group or the alkenyl group represented by $R^b$ is 18 or less, the solubility with the refrigerant is favorably maintained, and defects such as poor cooling due to precipitation in the refrigerating machine can be made less likely to occur.

The cycloaliphatic epoxy compound is a compound having a partial structure represented by the following general formula (3) in which carbon atoms constituting an epoxy group directly constitutes a cycloaliphatic ring.

(3)

Preferred examples of the cycloaliphatic epoxy compound include 1,2-epoxycyclohexane, 1,2-epoxycyclopentane, 3',4'-epoxycyclohexyhmethyl-3,4-epoxycyclohexanecarboxylate, bis(3,4-epoxycyclohexyhmethyl) adipate, exo-2,3-epoxynorbornane, bis(3,4-epoxy-6-methylcyclohexythmethyl) adipate, 2-(7-oxabicyclo[4.1.0]hept-2-yl)-spiro (1,3-dioxane-5,3'-[7]oxabicyclo[4.1.0]heptane, 4-(1-methylepoxyethyl)-1,2-epoxy-2-methylcyclohexane, and 4-epoxyethyl-1,2-epoxycyclohexane.

Examples of the aryloxirane compound include 1,2-epoxystyrene and alkyl-1,2-epoxystyrene.

Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyicosane.

Examples of the epoxidized fatty acid monoester include esters of an epoxidized fatty acid having 12 to 20 carbon atoms and an alcohol, phenol or alkylphenol having 1 to 8 carbon atoms. As the epoxidized fatty acid monoester, butyl, hexyl, benzyl, cyclohexyl, methoxyethyl, octyl, phenyl and butylphenyl esters of epoxystearic acid are preferably used.

Examples of epoxidized vegetable oils include epoxy compounds of vegetable oils such as soybean oil, linseed oil and cottonseed oil.

The acid scavenger is preferably at least one selected from glycidyl ester type epoxy compounds and glycidyl ether type epoxy compounds, and is preferably at least one selected from glycidyl ester type epoxy compounds from the viewpoint of excellent compatibility with resin materials used for members in a refrigerating machine.

The content of the acid scavenger is preferably 0.1% by mass or more, more preferably 0.2% by mass or more, and even more preferably 0.4% by mass or more, and is preferably 4% by mass or less, more preferably 2% by mass or less, even more preferably 1.5% by mass or less, and particularly preferably 1.2% by mass or less, based on the total amount of the refrigerating machine oil.

When the refrigerating machine oil according to the present embodiment contains an acid scavenger, the mass ratio of the content of the acid scavenger to the total content of the hindered phenol compound and the acid scavenger (content of acid scavenger/total content of hindered phenol compound and acid scavenger) in the refrigerating machine oil is preferably 0.1 or more, more preferably 0.3 or more, even more preferably 0.5 or more, and preferably 1.0 or less, more preferably 0.9 or less, even more preferably 0.8 or less.

When the refrigerating machine oil according to the present embodiment contains an acid scavenger, the total content of the hindered phenol compound and the acid scavenger in the refrigerating machine oil is preferably 0.7% by mass or more, more preferably 1.0% by mass or more, still more preferably 1.5% by mass or more, particularly preferably 2% by mass or more, and preferably 6% by mass or less, more preferably 5% by mass or less, still more preferably 4% by mass or less, particularly preferably 3% by mass or less, based on the total amount of the refrigerating machine oil.

The refrigerating machine oil according to the present embodiment may further contain other additives. Examples of other additives include antioxidants such as amine-based antioxidants, extreme pressure agents, oiliness agents, antifoaming agents, metal deactivators, antiwear agents, viscosity index improvers, pour point depressants, and detergent dispersants. The content of these additives may be 10% by mass or less or 5% by mass or less based on the total amount of the refrigerating machine oil.

The kinematic viscosity at 40° C. of the refrigerating machine oil may be preferably 3 mm$^2$/s or more, more preferably 4 mm$^2$/s or more, still more preferably 5 mm$^2$/s or more. The kinematic viscosity at 40'C of the refrigerating machine oil may be preferably 500 mm$^2$/s or less, more preferably 400 mm$^2$/s or less, still more preferably 300 mm$^2$/s or less. The kinematic viscosity at 100° C. of the refrigerating machine oil may be preferably 1 mm$^2$/s or more, more preferably 2 mm$^2$/s or more. The kinematic viscosity at 100° C. of the refrigerating machine oil may be preferably 100 mm$^2$/s or less, more preferably 50 mm$^2$/s or less.

The pour point of the refrigerating machine oil may preferably be −10° C. or less, more preferably −20° C. or less. The pour point in the present invention means a pour point measured in accordance with JIS K2269:1987.

The volume resistivity of the refrigerating machine oil may be preferably $1.0 \times 10^9$ Ω·m or more, more preferably $1.0 \times 10^{10}$ Ω·m or more, and still more preferably $1.0 \times 10^{11}$ Ω·m or more. The volume resistivity in the present invention means a volume resistivity at 25° C. measured in accordance with JIS C2101:1999.

The moisture content of the refrigerating machine oil may be preferably 200 ppm or less, more preferably 100 ppm or less, and even more preferably 50 ppm or less, based on the total amount of the refrigerating machine oil.

The acid value of the refrigerating machine oil may preferably be 1.0 mgKOH/g or less, more preferably 0.1 mgKOH/g or less. The acid value in the present invention means an acid value measured in accordance with JIS K2501:2003.

The ash content of the refrigerating machine oil may preferably be 100 ppm or less, more preferably 50 ppm or less. The ash content in the present invention means an ash content measured in accordance with JIS K2272:1998.

The refrigerating machine oil according to this embodiment is usually present in a refrigerating machine and mixed with a refrigerant containing trifluoroiodomethane as a working fluid composition for a refrigerating machine. That is, the refrigerating machine oil according to the present embodiment is used together with the refrigerant containing trifluoroiodomethane, and the working fluid composition for a refrigerating machine according to the present embodiment contains the refrigerating machine oil according to the present embodiment and the refrigerant containing trifluoroiodomethane.

The refrigerant is not particularly limited as long as it contains trifluoroiodomethane, and may contain only trifluoroiodomethane or may further contain a refrigerant other than trifluoroiodomethane. The content of trifluoroiodomethane is preferably 10% by mass or more, more preferably 20% by mass or more, still more preferably 30% by mass or more, based on the total amount of the refrigerant. The content of trifluoroiodomethane is preferably 100% by mass or less, more preferably 50% by mass or less, still more preferably 40% by mass or less, based on the total amount of the refrigerant.

Examples of the refrigerant other than trifluoroiodomethane include a saturated hydrofluorocarbon refrigerant, an unsaturated hydrofluorocarbon refrigerant, a hydrocarbon refrigerant, a fluorine-containing ether refrigerant such as perfluoroethers, a bis(trifluoromethyl)sulfide refrigerant, a natural refrigerant such as ammonia and carbon dioxide, and a mixed refrigerant of two or more selected from these refrigerants.

Examples of the saturated hydrofluorocarbon refrigerant include a saturated hydrofluorocarbon having preferably 1 to 3 carbon atoms, more preferably 1 to 2 carbon atoms. Specific examples include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon refrigerant is appropriately selected from the above depending on the application and the required performance. Preferable examples include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60% by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specifically, a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

Preferable examples of the mixed refrigerant of trifluoroiodomethane and the saturated hydrofluorocarbon refrigerant include an R32/R125/trifluoroiodomethane mixed refrigerant and an R32/R410A/trifluoroiodomethane mixed refrigerant. The ratio of R32:trifluoroiodomethane in such a mixed refrigerant is preferably 2 to 90:90 to 10, more preferably 10 to 70:70 to 30, still more preferably 30 to 60:60 to 40, and particularly preferably 40 to 60:50 to 40, from the viewpoint of compatibility with refrigerating machine oil, low GWP, and incombustibility. Similarly, the ratio of the mixed refrigerant of R32 and trifluoroiodomethane: R125 is preferably 10 to 95:90 to 5, more preferably 50 to 95:50 to 5, and still more preferably 80 to 95:20 to 5.

The unsaturated hydrofluorocarbon (FO) refrigerant is preferably a fluoropropene, more preferably a fluoropropene having 3 to 5 fluorine atoms. Specifically, any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more thereof are preferable. One or two or more selected from FO-1225ye, HFO-1234ze and HFO-1234yf are preferable from the viewpoint of the physical properties of the refrigerant.

The hydrocarbon refrigerant is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, normal butane, isobutane, cyclobutane, methyleyclopropane, 2-methylbutane, normal pentane, and a mixture of two or more thereof. Among them, those which are gaseous at 25° C. and 1 atm are preferably used, and propane, normal butane, isobutane, 2-methylbutane or a mixture thereof is preferably used.

The content of the refrigerating machine oil in the working fluid composition for a refrigerating machine may be preferably from 1 to 500 parts by mass, more preferably from 2 to 400 parts by mass, based on 100 parts by mass of the refrigerant.

The refrigerating machine oil and the working fluid composition for a refrigerating machine according to the present embodiment are suitably used for an air conditioner having a reciprocating or rotary hermetic compressor, a refrigerator, an open or hermetic car air conditioner, a dehumidifier, a water heater, a freezer, a freezing and refrigerating warehouse, an automatic vending machine, a showcase, a refrigerating machine such as a chemical plant, and a refrigerating machine having a centrifugal compressor.

A refrigerating machine in which the refrigerating machine oil or the working fluid composition for a refrigerating machine according to the present embodiment can be suitably used includes at least a refrigerant circulation system in which a compressor, a condenser (gas cooler), an expansion mechanism (capillary, expansion valve, or the like), and an evaporator (heat exchanger) are connected by piping in this order. In particular, when a copper pipe is used as the pipe in the refrigerating machine, the refrigerating machine oil or the working fluid composition for a refrigerating machine according to the present embodiment can be suitably used. The refrigerant and the refrigerating machine oil may be separately filled in the refrigerating machine according to the present embodiment.

An example of a refrigerating machine in which the refrigerating machine oil or working fluid composition for a refrigerating machine according to the present embodiment can be suitably used is shown in FIG. 1. FIG. 1 is a schematic diagram illustrating an embodiment of the refrigerating machine. As shown in FIG. 1, the refrigerating machine 10 includes at least a refrigerant circulation system 6 in which a compressor (refrigerant compressor) 1, a condenser (gas cooler) 2, and an expansion mechanism (capillary, expansion valve, etc.) 3 and an evaporator (heat exchanger) 4 are sequentially connected by a pipe (flow path) 5.

In the refrigerant circulation system 6, first, the high-temperature refrigerant discharged from the compressor 1 into the pipe 5 becomes a high-density fluid (supercritical fluid or the like) in the condenser 2. Subsequently, the refrigerant is liquefied by passing through the narrow flow path having the expansion mechanism 3, and is further vaporized in the evaporator 4 to have a low temperature. The cooling by the refrigerating machine 10 utilizes a phenomenon that the refrigerant takes heat from the surroundings when the refrigerant is vaporized in the evaporator 4.

In the compressor 1, a small amount of refrigerant and a large amount of refrigerating machine oil coexist under high temperature conditions. The refrigerant discharged from the compressor 1 to the pipe 5 is in a gaseous state and contains a small amount (usually 1 to 10% by volume) of the refrigerating machine oil as mist, and a small amount of the refrigerant is dissolved in the mist-like refrigerating machine oil (point a in FIG. 1).

As the compressor 1, a high-pressure container-type compressor in which a motor including a rotor and a stator is accommodated in a closed container storing refrigerating machine oil, a rotary shaft fitted to the rotor, and a compressor unit connected to the motor via the rotary shaft are accommodated, and high-pressure refrigerant gas discharged from the compressor unit stays in the closed container is exemplified.

The compressor is not limited to a rotary type such as the compressor 1, and may be a reciprocating type such as a piston-crank type, a screw type, or a centrifugal type. The hermetic structure of the compressor may be any of an open type, a semi-hermetic type, and a hermetic type, and the hermetic type is particularly preferable.

Examples

Hereinafter, the present invention will be described more specifically based on Examples, but the present invention is not limited to the following Examples.

In the Examples and Comparative Examples, a refrigerating machine oil having the composition (% by mass based on the total amount of the refrigerating machine oil) shown in Table 1 was prepared using a base oil and additives shown below. The kinematic viscosity at 40° C. of these refrigerating machine oils was about in the range of 70 to 75 mm/s.

(Base Oil)

A1: polyol ester of pentaerythritol and mixed fatty acid of 2-ethylhexanoic acid/3,5,5-trimethylhexanoic acid (molar ratio 37/63) (kinematic viscosity at 40° C.: 75.5 mm²/s, kinematic viscosity at 100° C.: 8.9 mm²/s)

(Additive)

B1: 2,6-di-tert.-butyl-p-cresol
C1: glycidyl neodecanoate (epoxy-based acid scavenger)
C2: phenyl glycidyl ether (epoxy-based acid scavenger)
D1: diphenylamine (amine-based antioxidant)

As a refrigerant containing trifluoroiodoethane, difluoromethane (R32), a mixture of difluoromethane (R32)/pentafluoroethane of 50/50% by mass (R410A), and trifluoroiodomethane were mixed to prepare a mixed refrigerant containing R32, R125 and trifluoroiodomethane (mixing ratio (mass ratio): R32/R410A/trifluoroiodomethane=37.5/23/39.5, i.e., R32/R125/trifluoroiodomethane=49.0/11.5/39.5). The mixed refrigerant having this composition has a GWP of 733 and is considered to be a nonflammable refrigerant (A1) in the category of the ASHRAE.

Each of the refrigerating machine oils of Examples 1 to 5 and Comparative Examples 1 to 2 was subjected to the following evaluation test.

In an autoclave, 30 g of the refrigerating machine oil prepared to have a moisture content of 10 ppm or less (initial color: L0.5, initial acid value: 0.01 mgKOR/g or less), 30 g of the mixed refrigerant prepared above, and a 0.6 mm φ×50 mm catalyst (one each of copper, iron, and aluminum) were placed in a 200 ml autoclave, heated to 175° C., and held for 48 hours. After 48 hours, the content of impurities, the color (ASTM D152) and the acid value of the refrigerating machine oil were measured. The results are shown in Table 1.

TABLE 1

|  |  | Example 1 | Example 2 | Example 3 | Example 4 | Example 5 | Comparative Example 1 | Comparative Example 2 |
|---|---|---|---|---|---|---|---|---|
| Compsition (% by mass) | A1 | Remainder | Remainder | Remainder | Remainder | Remainder | Remainder | Remainder |
|  | B1 | 0.9 | 1.8 | 2.7 | 0.9 | 0.9 | 0.3 | — |
|  | C1 | 0.7 | 0.7 | 0.7 | 3 | — | 0.7 | 0.7 |
|  | C2 | — | — | — | — | 3 | — | — |
|  | D1 | — | — | — | — | — | — | 2.7 |
| Impurities | mg/100 g OIL | 0 | 0 | 0 | 0 | 0 | 5.1 | 20.1 |
| Color | ASTM D156 | L0.5 | L0.5 | L0.5 | L0.5 | L0.5 | L7.5 | D8.0 |
| Acid value | mgKOH/g | 0.03 | 0.03 | 0.03 | 0.03 | 0.02 | 0.34 | 0.73 |

The contents of impurities and the acid values of the refrigerating machine oils of Examples 1 and 2 and Comparative Example 1 were measured in the same manner as described above with the holding time extended from 48 hours to 72 hours. The contents of impurities and the acid values were significantly reduced by 86% and 25%, respectively, when using the refrigerating machine oil of Example 1, and were significantly reduced by 97% and 84%, respectively, when using the refrigerating machine oil of Example 2, compared to those when using the refrigerating machine oil of Comparative Example 1.

REFERENCE SIGNS LIST

1: compressor, 2: condenser, 3: expansion mechanism, 4: evaporator, 5: pipe, 6: refrigerant circulation system, 10: refrigerating machine.

The invention claimed is:

1. A working fluid composition for a refrigerating machine, comprising:
    a refrigerant comprising trifluoroiodomethane, difluoromethane (R32) and pentafluoroethane (R125), wherein a ratio of (R32 and trifluoroiodomethane): R125 is 80 to 95:20 to 5; and
    a refrigerating machine oil comprising
        a polyol ester of pentaerythritol and a fatty acid having 4 to 9 carbon atoms,
        a hindered phenol compound comprising 2,6-di-tert-butyl-p-cresol, and
        an acid scavenger being at least one selected from the group consisting of a glycidyl ether epoxy compound represented by the following formula (1) and a glycidyl ester epoxy compound represented by the following formula (2):

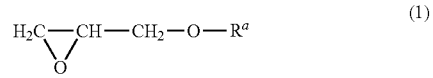

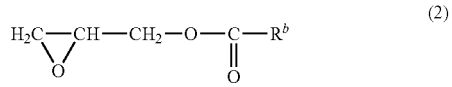

wherein $R^a$ represents an aryl group or an alkyl group having 5 to 18 carbon atoms, and $R^b$ represents an alkyl group having 5 to 18 carbon atoms,
    wherein a content of the polyol ester is 90% by mass or more, a content of the hindered phenol compound is 0.8 to 3% by mass, and a content of the acid scavenger is 0.7 to 3% by mass, based on a total amount of the refrigerating machine oil; and
    wherein the working fluid composition comprises no unsaturated hydrofluorocarbon refrigerant.

2. A refrigerating machine comprising:
    a refrigerant circulation system wherein in which a compressor, a condenser, an expansion mechanism, and an evaporator are connected by piping in this order; and
    the working fluid composition for a refrigerating machine according to claim 1, filled in the refrigerant circulation system.

3. The working fluid composition according to claim 1, wherein the refrigerant consists of the trifluoroiodomethane, the difluoromethane (R32), and the pentafluoroethane (R125).

4. The working fluid composition according to claim 1, wherein the fatty acid comprises at least one of 2-ethylhexanoic acid and 3,5,5-trimethylhexanoic acid.

5. The working fluid composition according to claim 1, wherein the fatty acid comprises 2-ethylhexanoic acid and 3,5,5-trimethylhexanoic acid.

\* \* \* \* \*